United States Patent [19]

Ernst et al.

[11] Patent Number: 5,373,136
[45] Date of Patent: Dec. 13, 1994

[54] LASER MACHINING INSTALLATION

[75] Inventors: Zumstein Ernst, Burgdorf; Hunziker Urs, Wynau, both of Switzerland

[73] Assignee: Bystronic Laser AG, Niederonz, Switzerland

[21] Appl. No.: 983,699

[22] Filed: Dec. 1, 1992

[30] Foreign Application Priority Data

Dec. 4, 1991 [CH] Switzerland ............. 03560/91-1

[51] Int. Cl.$^5$ ........................................ B23K 26/00
[52] U.S. Cl. ............................ 219/121.67; 219/121.82
[58] Field of Search ................. 219/121.67, 121.72, 219/121.82, 121.78, 121.79

[56] References Cited

U.S. PATENT DOCUMENTS

| | | | |
|---|---|---|---|
| 3,528,424 | 9/1970 | Ayres | 128/303.1 |
| 4,609,807 | 9/1986 | Morrissy et al. | 219/121.67 |
| 5,049,723 | 9/1991 | Macdonald | 219/121.83 |
| 5,132,510 | 7/1992 | Klingel et al. | 219/121.82 |

FOREIGN PATENT DOCUMENTS

| | | |
|---|---|---|
| 0321686 | 6/1989 | European Pat. Off. . |
| 2415513 | 8/1979 | France . |
| 677332 | 5/1991 | Switzerland . |
| 8911949 | 12/1989 | WIPO . |

OTHER PUBLICATIONS

Patent Abstracts of Japan, "Equipment For Machining Pipe by Laser Beam Machine", vol. 10, No. 83, Apr. 2, 1986.

*Primary Examiner*—C. L. Albritton
*Attorney, Agent, or Firm*—Marks & Murase

[57] ABSTRACT

The cutting head is displaceable along a cutting bridge which is in turn displaceable along transversal guidings, so as to be longitudinally and transversally displaceable over a working table in order to cut pieces from flat stock. Said material, or said pieces, respectively, lie on a supporting grate, and a second supporting grate can be discharged and charged with a new plate during the machining operation. Both of said supporting grates can selectively be brought to a desired position. More particularly, both supporting grates can be removed from said working table in order to render its interior accessible and free. By means of a turning axle which is journalled on the table mount, a tube or a profile can then be inserted in said turning axle by a charging device in order to be machined. The machining installation is thus very versatile, allows a rational processing and due to a good accessibility, a comfortable operation when retooling from one to the other processing mode. Preferably, the laser beam is guided through a movable shear comprising tubes of a constant length, whereby the optical distance between the laser source and the cutting head can be kept constant.

16 Claims, 7 Drawing Sheets

LASER MACHINING INSTALLATION

BACKGROUND OF THE INVENTION

The present invention refers to a laser machining installation with so-called flying optics, i.e. having a stationary working table over which the processing head is displaceable longitudinally and transversally. This arrangement allows a space-saving design where large workpieces, in particular plates from which individual pieces are being cut out, remain in the same place during the machining operation.

SUMMARY OF THE INVENTION

In the framework of such an installation, it is a first object of the invention to provide a specially versatile installation which is simple to operate and to retool due to good accessibility. According to the invention, this object is attained in a laser machining installation which is characterized by a combination of the following features:

a) said processing head is displaceable along a bridge extending in the longitudinal direction;

b) said bridge is displaceable on two guidings extending in the transversal direction; and c) a turning axle is disposed under one of said guidings extending in the transversal direction.

This installation allows an alternative machining of flat workpieces and of profiles. As no longitudinal guidings are present, the working table is well accessible from at least one side. With a suitable design of said transversal guidings and of said cutting bridge, a high precision is obtained even in the case of great bridge lengths up to three meters. Said bridge is preferably formed of a stable hollow profile. The mentioned good accessibility from one side is particularly advantageous if said turning axle is disposed on that side.

Indeed, a processing machine having transversal guidings for a cutting bridge extending in the longitudinal direction is known from WO89/11949, but its object is not a particularly good accessibility. A machining installation having a turning axle unit is known from CH-A-677,332. In order to operate said unit, it is necessary to swing it in place, and in order to cut plates on the cutting table, it must be swung away. The suspension and guidance of the cutting head is complicated.

A condition for the alternative machining of flat workpieces and of profiles which are chucked in the turning axle is the possibility of removing the supporting grate for flat workpieces of said machine table in order to create the required space and the necessary accessibility for the machining of profiles. For this purpose, two supporting grates may either be provided, said grates being removable from the machining area separately or in common, or individually pivotable supporting elements.

Since the working table is usually accessible on one longitudinal side only, the safety requirements can be fulfilled by providing a removable protective cover on that longitudinal side. It has been found to be advantageous that no guiding and correspondingly, no part which is movable along said guiding, is present on said side.

Particular problems result in laser machining installations where the laser beam is delivered from the laser source to the cutting head through bellows. The optical path between the resonator and the cutting head is subject to strong variations over the cutting range. Besides the known drawbacks of bellows, problems arise due to the fact the focusing conditions vary as a function of the optical distance between the laser source and the cutting head, which influences the cutting quality. It is another object of the invention to avoid these drawbacks and to achieve a substantially constant optical distance between the laser source and the cutting head by means of rigid radiation protection elements. This object is attained in a laser machining installation to which the laser beam from the laser source is delivered through a closed channel, wherein said channel comprises a movable shear comprising tubes of a constant length, in such a manner that the optical distance between the laser source and the cutting head, i.e. the length of the laser beam, remains constant. The particular advantages of this solution will be discussed below.

SHORT DESCRIPTION OF THE DRAWINGS

The invention is described in more detail hereinafter with reference to two embodiments which are illustrated in the drawing.

DETAILED DESCRIPTION OF THE INVENTION

Figure 1:
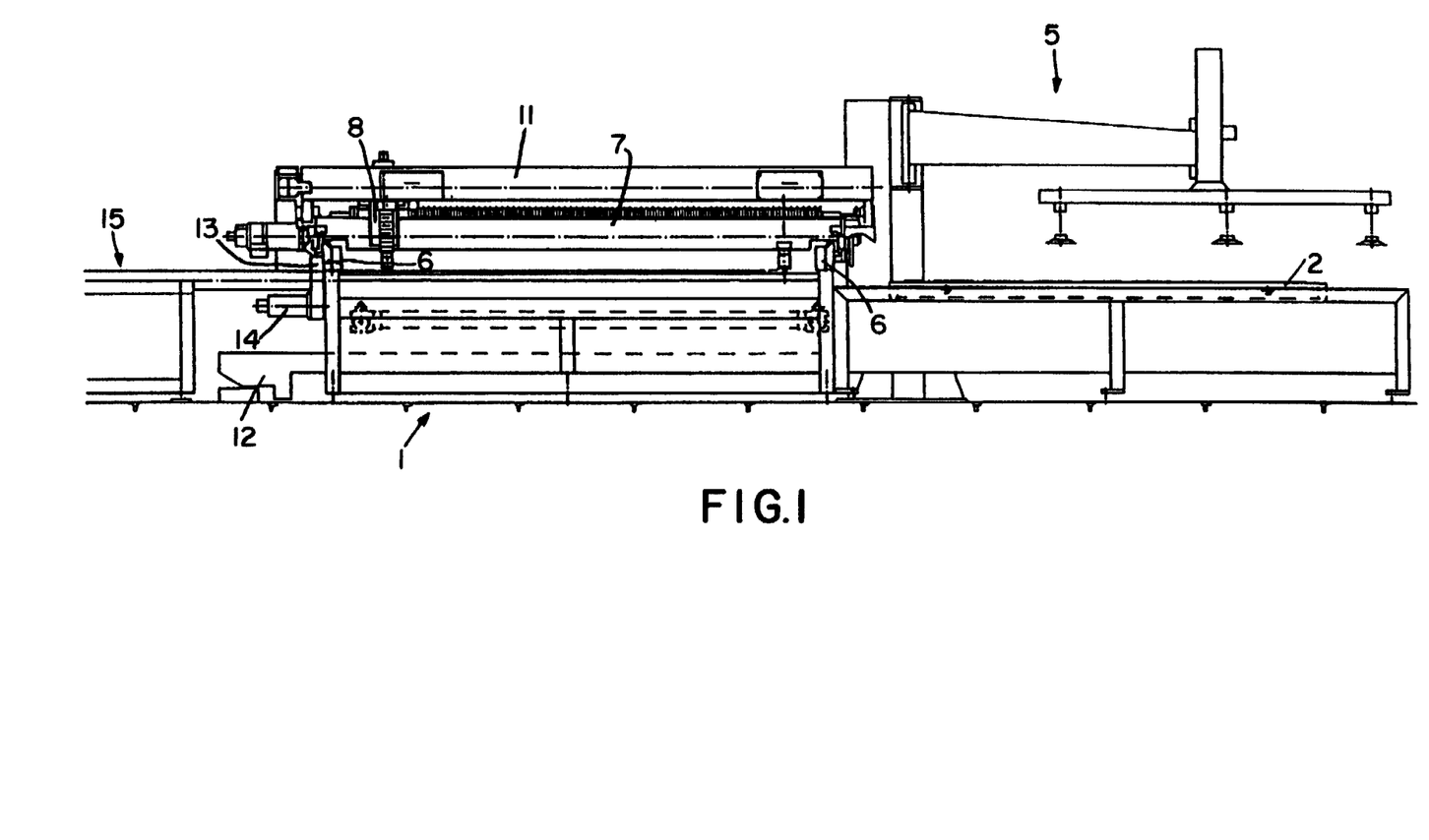
FIG. 1 is a side view of the first machining installation.
Figure 2:
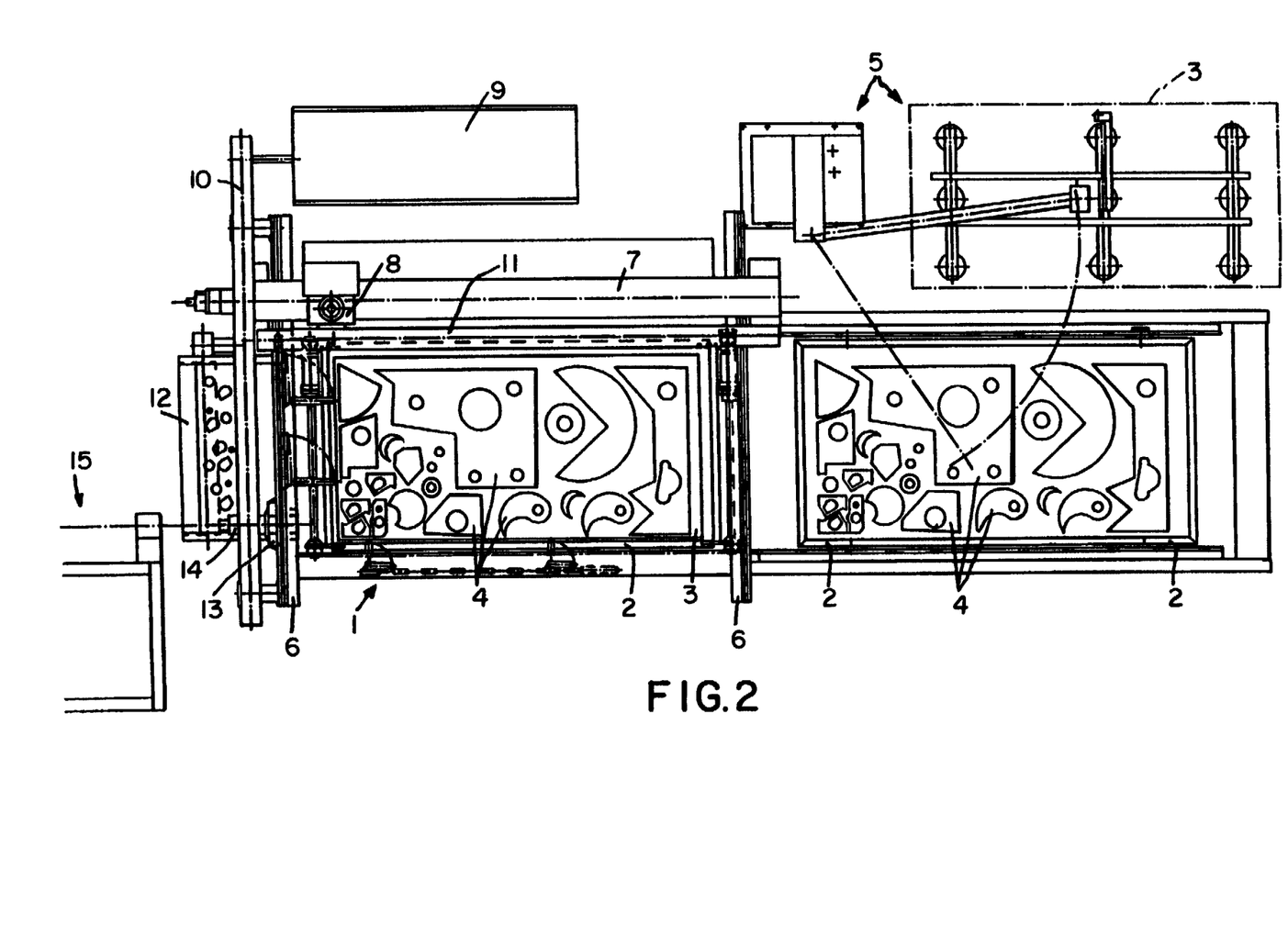
FIG. 2 is a plan view of said machining installation.

The laser machining installation shown in FIGS. 1 to 5 comprises a working table 1 having in its upper part a supporting grate of which FIG. 2 shows only frame 2 but not the supporting ribs which serve for supporting a plate 3, or parts 4 which have been cut out therefrom, respectively. As appears in FIG. 1 and 2, two supporting grates are provided which may alternatively be in a working position inside table 1 or in a charging and discharging position on the right outside the machining area. A new plate 3 can be placed upon supporting grate 2 in its charging position by means of a charging device 5 after the cut pieces 4 have been removed. At the same time, a new plate 3 can be machined in the working position. In a manner known per se and not represented or discussed in more detail, the two existing supporting grates 2 may be at different levels either in the working position or in the charging position.

A respective lateral guiding 6 is secured to the two narrow sides of working table 1. Cutting bridge 7 is transversally displaceably guided on said two lateral guidings 6, and cutting head 8 is longitudinally guided and displaceable on said cutting bridge 7. The laser beam passes from laser source 9 through schematically illustrated, closed channels with bellows 10 and 11 to cutting head 8. Underneath cutting table 1, a conveyor belt 12 is disposed by means of which wastes falling through said supporting grate during machining are carried away as indicated in FIG. 2 towards the left of said figure.

Figure 3:
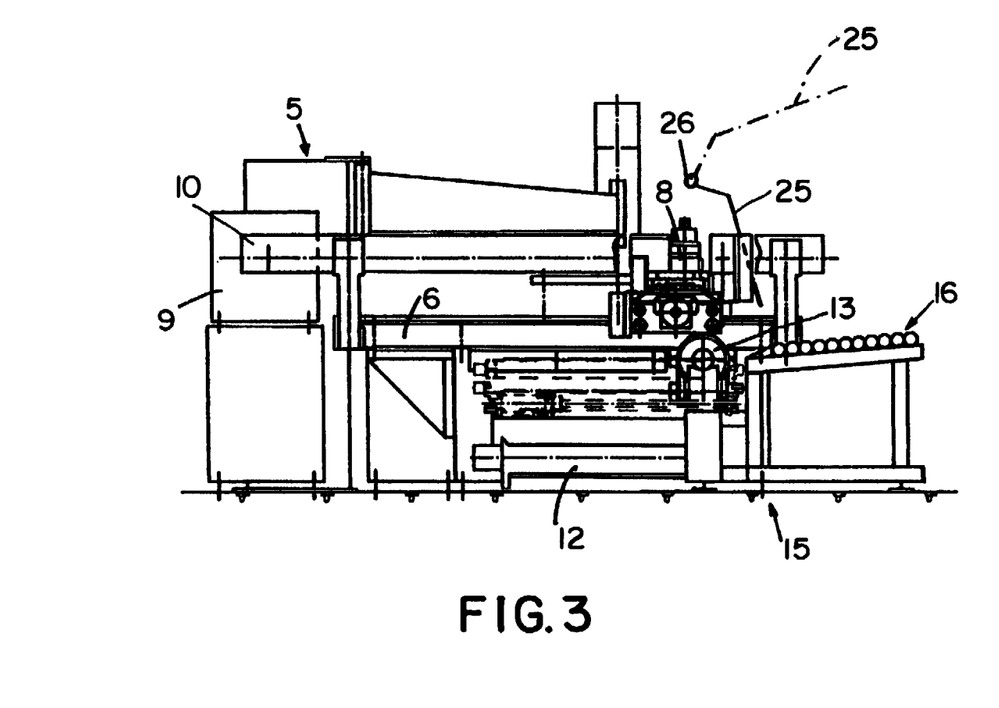
FIG. 3 is a front view from the left in FIG. 1 and 2.
Figure 4:
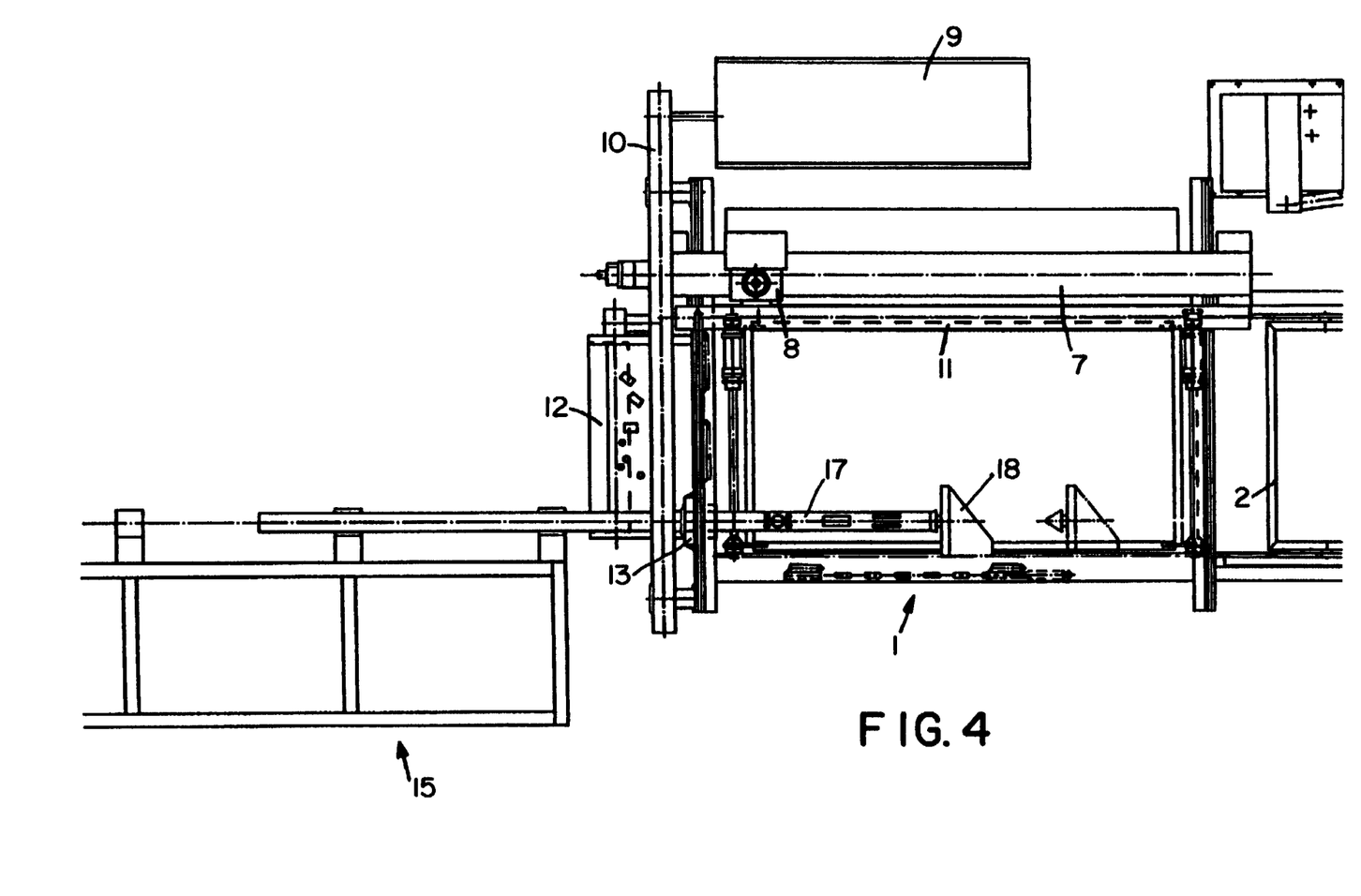
FIG. 4 is a partial plan view of the installation with the supporting grate removed and while a profile is being machined;.
Figure 5:
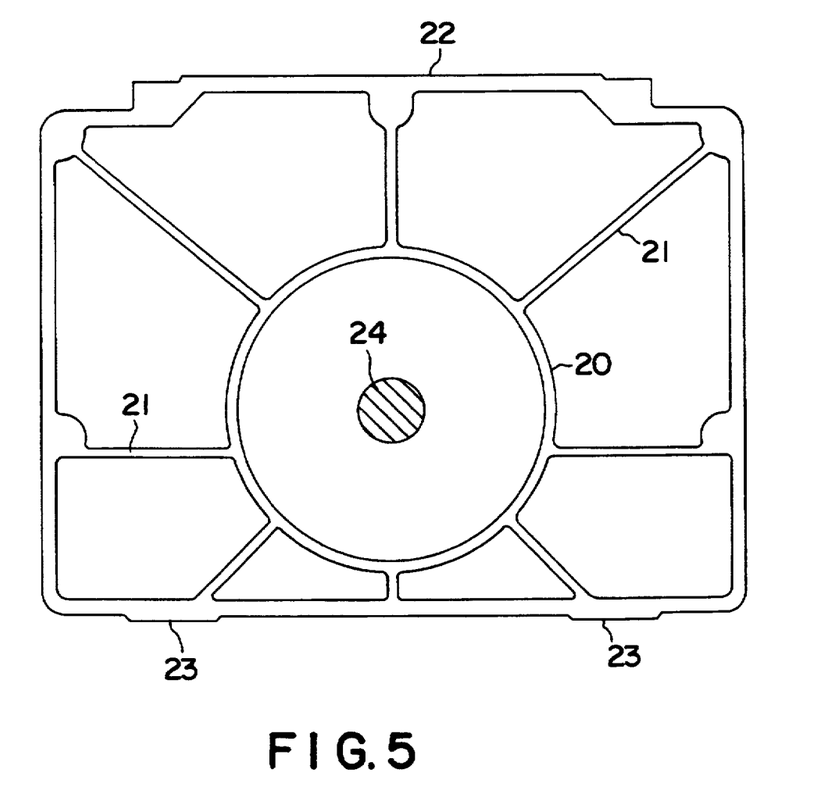
FIG. 5 shows the profile of the bridge.

Underneath transversal guiding 6 shown at the left of FIGS. 1 and 2, a turning axle 13 is journalled on the mount of working table 1, said axis comprising a rotatable chuck with a through-going bore for receiving profiles to be machined. The turning axle is rotated by means of a motor 14. Turning axle 13 is preceded by a charging device 15, and it is indicated in FIG. 3 that automatic charging from a magazine 16 is possible. FIG. 4 shows a plan view of the installation with supporting grates 2 moved to their charging position, in which case the inside of working table 1 is freely accessible from above. The chuck of turning axle 13 holds a tube or profile 17 which is additionally guided by means of a tailstock 18. FIG. 4 also indicates the manner in which holes of any shape can be cut into tube or profile 17. In the cutting operation, only cutting head 8 is moved, or tube or profile 17 is rotated as well, depending on the size and shape of said holes.

The advantage of being able to use relatively short and favorably machinable guidings 6 for cutting bridge 7 is accompanied by the drawback that cutting bridge 7 will become quite long in large installations, which may result in problems with respect to stability and precision. According to the invention, this problem is encountered by using a very stable, drawn aluminum profile according to FIG. 5 for the cutting bridge. This hollow profile comprises an exterior box 19 of approximately rectangular cross-section which is connected to an internal tube 20 by ribs 21. Profile 19 has precision-finished surfaces 22 and 23. The light metal profile according to FIG. 5 allows to achieve a high stability with a relatively low weight. The hollow profile of FIG. 5 may serve to accommodate auxiliary aggregates such as a driving and coupling shaft 24 for the two coupled drives for displacement of bridge 7 along guidings 6.

The operation of the illustrated machining installation follows largely from the preceding description. While cutting flat pieces 4 from plates 3, supporting grates 2 alternate between the working position and the charging and discharging position, the pieces which have previously been cut on the other grate being removed and a new plate 3 being laid on in the manner indicated in FIG. 2. After the machining is completed, the grates are exchanged, and a new working cycle is started which includes cutting pieces, removing cut pieces and charging a new plate 3.

For the machining of tubes or profiles, both supporting grates 2 are moved to the charging and discharging position, and tailstock 18 is mounted. A tube or profile 17 is then inserted from the left in FIG. 4 through the chuck of turning axle 13, chucked, and centered by means of tailstock 18. Tubes or profiles of large cross-sections may also be inserted from above and lodged in a chuck of said turning axle. The machining of the tube or profile is then effected. While machining tubes or profiles according to FIG. 4, in particular, it is important that the interior of the working table is well accessible from the side shown at the bottom of FIG. 4. This is the case to a particular extent because no guiding is provided on this side, and because cutting bridge 7 with cutting head 8 may be moved to the other side completely. Supporting grates 2, as well, are completely removed from the working area on the side opposite turning axle 13, so as not to hinder the mounting of tailstock 18 and generally, the arrangement of the entire installation in view of machining tubes or profiles, in any way. Of course, this applies for every retooling.

The good accessibility of the working area at least from one side goes along with a certain danger of injuries when the machine is approached inadvertently during machining. Therefore, a protective hood 25 which is schematically represented in FIG. 3 may be provided which is e.g. pivotable on a hinge 26 up to the position indicated by dots and dashes in order to render the working area accessible. Also, a protective shield which is retractable on the front side might be provided.

In an alternative embodiment, instead of the two displaceable grates 2, a grate formed of swinging supporting arms according to EP-90810770.9 might be provided. For the machining of tubes or profiles, said supporting arms could be swung down completely in order to make the working area accessible from above and free for inserting a tube or profile.

The arrangement of turning axle 13, charging device 15 and of conveyor belt 12 on the front side of the installation which is visible in FIG. 3 requires laser source 9 and auxiliary aggregates to be disposed at the rear of the cutting table instead of the front side, as usual. As will be shown below, however, this arrangement also has advantages. Furthermore, it appears clearly in FIG. 2 that the optical distance between laser source 9 and cutting head 8, i.e. the length of the laser beam, is subject to major variations. In the position of the cutting head shown in FIG. 2, said distance is quite short, while it is considerably greater in the diagonally opposite position of the cutting head at the bottom and on the right of FIG. 2. This results in problems in order to maintain an optimum cutting quality with certain materials. Since the position of the focus as well as the power density at the machining point vary, differences in the cutting quality will appear. In view of radiation protection, bellows (not shown) are required, which involve the known drawbacks.

Independently of the kind of the cutting machine, the invention also aims at an elimination of the above-mentioned drawbacks resulting from the conventional laser beam guidance according to FIGS. 1–5. The solution is described in claims 11–16 and explained by way of the embodiment according to FIGS. 6 and 7. In these figures, corresponding parts are referenced as in FIGS. 1–5.

Figure 6:
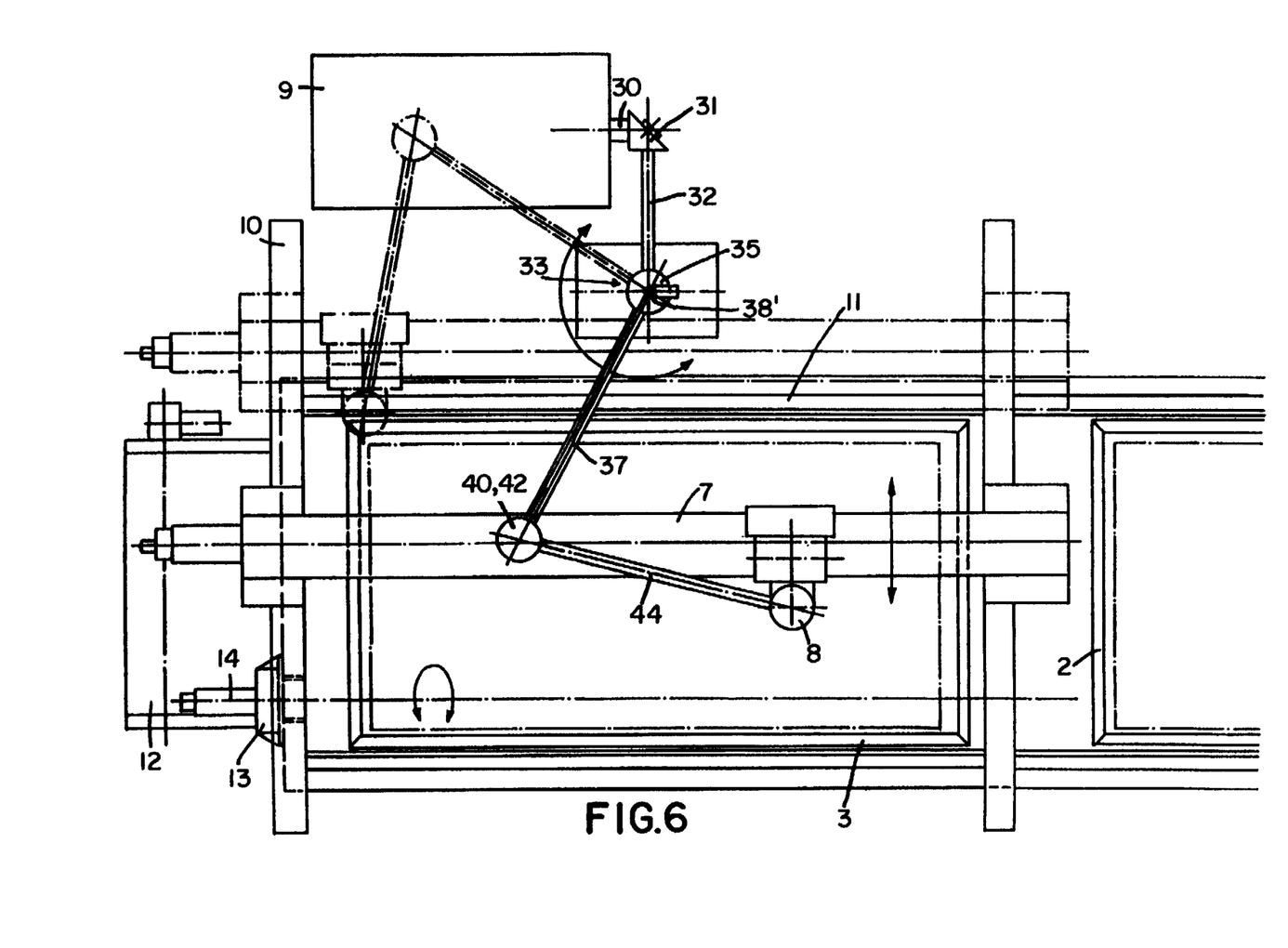
FIG. 6 is a partial plan view of the second machining installation.
Figure 7:
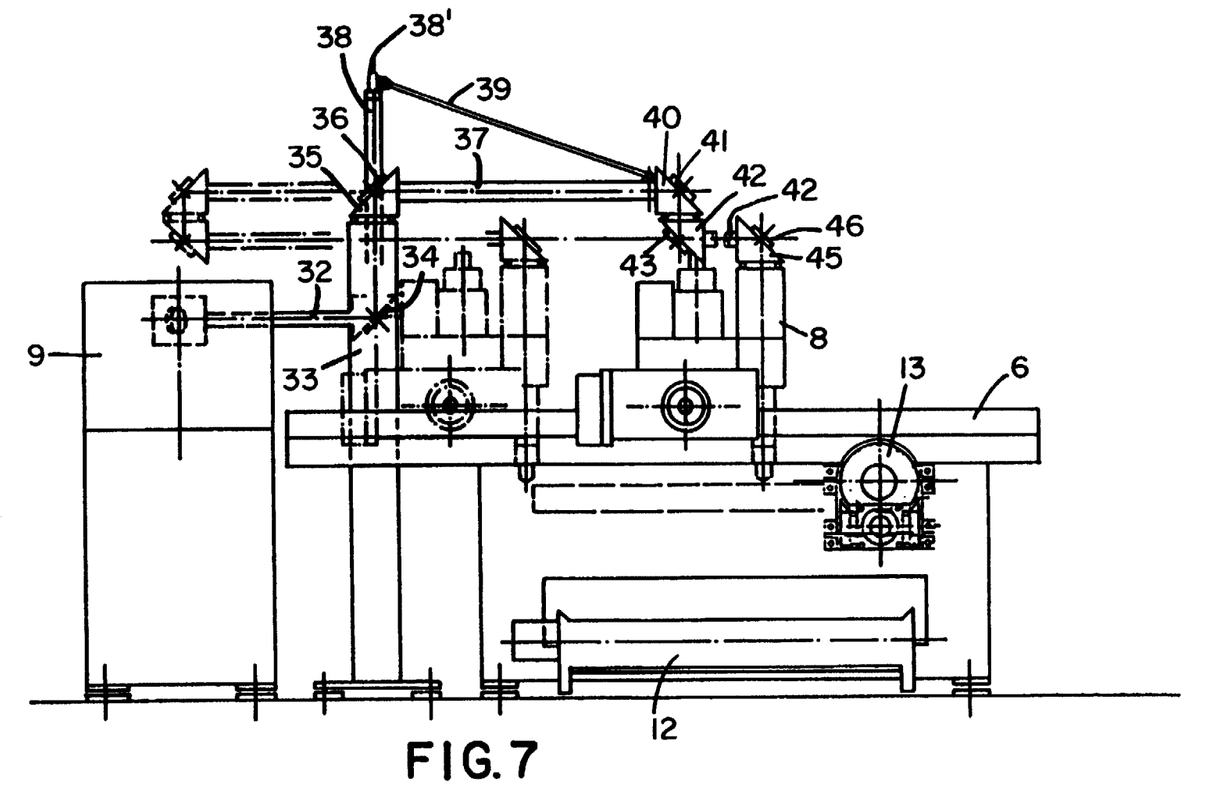
FIG. 7 is a front view from the left in FIG. 6.

From laser source 9, the laser beam passes through a tube 30, a mirror 31 and another tube 32 to a column 33 wherein it is guided upwards by a mirror 34. These parts are stationary. At the upper end of column 33, a rotatable deviation element 35 comprising a mirror 36 is provided through which the laser beam is deviated into a tube 37 which is rigidly connected to deviation element 35. A support 38 is secured to deviation element 35, an anchorage 39 for tube 37 being attached to said support. To one end of tube 37, another deviation element 40 comprising a deviation mirror 41 is secured which is rotatably connected to another deviation element 42 with deviation mirror 43. Deviation element 42 is rigidly connected to a tube 44 whose other end is connected to a deviation element 45 with mirror 46 by which the laser beam is deviated towards the axis of cutting head 8. Deviation element 45 is rotatably connected to cutting head 8.

It appears without further explanations that the optical distance between laser source 9 and cutting head 8 along the movable shear system including tubes 37 and 44 is constant, and that the drawbacks resulting from a variable distance are thereby prevented. The bellows which are usual in conventional installations are omitted. The focusing conditions at the machining point always remain the same, which allows not only to improve the cutting quality, but also to increase the cutting power. Vertical displacements of the focusing optics of some millimeters or centimeters do not have a substantial influence in practice. Due to the fact that laser source 9 is disposed opposite the operating side, the shear formed of tubes 37 and 44 is always in the area of table 1 during machining, i.e. the security measures described above can be applied. In the rest or reference position of cutting head 8, which is indicated by dots and dashes in FIG. 6, said shear is entirely outside the cutting table and therefore does not impede service or retooling operations. The tube shear offers a better radiation protection than bellows. Mirror 31 might be omitted if the beam from laser source 9 enters column 33 directly.

As mentioned, the beam guidance of FIGS. 6 and 7 may advantageously be applied in connection with an installation according to FIGS. 1-5, i.e. according to claims 1-10, but independently therefrom, it can also be used in other similar cutting machines with longitudinal guidings for a laterally disposed cutting bridge and without a turning axle. Consequently, an independent protection for said beam guidance by means of a tube shear according to FIGS. 6 and 7 is being applied for.

Other variants are possible. Thus, support 38 can be rigidly connected to column 33 and may have a rotatable head 38' to which anchorage 39 is attached.

In the embodiment according to FIGS. 6 and 7, tubes 37 and 44 are moved in planes which are parallel to the working plane. However, tubes might be provided which are pivotable in planes perpendicular to the working plane. Such an embodiment may be conceived in the sense that tube 37 is not only pivotable around the vertical axis of column 33 but moreover around a horizontal axis that tubes 37 and tube 44, are pivotably connected around a horizontal axis, the latter being connected to cutting head 8 on a horizontal and a vertical axis.

For weight and torque compensation, tube 37 might be extended beyond its pivot point on column 33 and provided with a counterweight on said extension.

We claim:

1. A laser machining installation having a working table over which a processing head is displaceable in the longitudinal and transversal directions, characterized by a combination of the following features:
   a) said processing head is displaceable along a bridge extending in the longitudinal direction;
   b) said bridge is displaceable on two guidings extending in the transversal direction; and
   c) a turning axle is disposed under one of said guidings extending in the transversal direction.
2. The installation of claim 1, wherein said turning axle is provided with a chuck which is open from end to end and externally chargeable.
3. The installation of claim 1, wherein a charging device is associated to said turning axle.
4. The installation of claim 3, wherein said charging device is automatic.
5. The installation of claim 1, wherein said working table comprises two supporting grates which are capable of being selectively moved to a charging and discharging position and are displaceable with respect to said turning axle and outside the working area.
6. The installation of claim 1, comprising a working table formed of supporting arms which are adapted to be swung down, wherein all supporting arms can be swung down in common in order to create a free space for the machining of a workpiece which is held in said turning axle.
7. The installation of claim 1, wherein said bridge is formed of an extruded profile, preferably a light metal profile.
8. The installation of claim 7, wherein a drive and coupling shaft for a respective transversal drive at both ends of said bridge is disposed in an internal space of said profile.
9. The installation of claim 1, wherein a conveyor belt for the disposal of wastes or of cut pieces is disposed under said working table.
10. The installation of claim 1, wherein a removable protection cover is provided on the operating side.
11. A laser machining installation having a working table over which a cutting head is displaceable in the longitudinal and the transversal direction and to which the laser beam from a laser source is delivered through a closed channel, wherein said channel comprises a movable shear comprising tubes of a constant length, in such a manner that the optical distance between the laser source and the cutting head, i.e. the length of the laser beam, remains constant.
12. The installation of claim 11, wherein said laser source is disposed on a longitudinal side of said working table.
13. The installation of claim 11, wherein said shear is provided with deviation elements comprising deviation mirrors, said deviation elements being connected to the ends of said tubes and being rotatably connected to each other, to a stationary beam guiding device or to said cutting head, respectively.
14. The installation of claim 11, wherein said shear is stabilized by means of anchorage means.
15. The installation of claim 11, wherein said shear comprises tubes which are pivotable in planes which are parallel or perpendicular to the working plane.
16. The installation of claim 11, wherein an articulation between two tubes of said shear comprises a pair of mirrors, said pair allowing to deviate the laser beam from one tube axis to the axis of said articulation, and from the latter to the axis of the other tube.

* * * * *